(12) United States Patent
Steele et al.

(10) Patent No.: US 7,167,481 B2
(45) Date of Patent: Jan. 23, 2007

(54) TECHNIQUE FOR COMPUTING PATHWAYS IN A MULTI-STAGE SWITCH FABRIC THROUGH EXPLOITATION OF SYMMETRICAL LINKS

(75) Inventors: David C. Steele, Kanata (CA); Jeff J. Towers, Kanata (CA); Andrew King, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 1061 days.

(21) Appl. No.: 10/119,765

(22) Filed: Apr. 11, 2002

(65) Prior Publication Data

US 2003/0118013 A1    Jun. 26, 2003

(30) Foreign Application Priority Data

Dec. 20, 2001   (CA)   .................... 2365963

(51) Int. Cl.
*H04L 12/28* (2006.01)
*H04L 12/56* (2006.01)

(52) U.S. Cl. .................. 370/413; 370/230; 370/386; 370/390; 370/398; 370/412; 370/422; 370/400; 370/428

(58) Field of Classification Search .................. None
See application file for complete search history.

(56) References Cited

U.S. PATENT DOCUMENTS 5,247,513 A    9/1993  Henrion et al.
5,550,815 A *  8/1996  Cloonan et al. ............ 370/396
5,754,120 A    5/1998  Argentati
5,781,546 A    7/1998  Sethu
6,661,788 B2 * 12/2003  Angle et al. ................ 370/390

FOREIGN PATENT DOCUMENTS

WO    WO 00/77986 A1    12/2000

OTHER PUBLICATIONS

European Search Report EP 02 25 8927, Sep. 19, 2003.
A Rearrangement Algorithm for Three-Stage Switching Networks, Satoru Ohta and Hiromi Ueda, NTT Electrical Communications Laboratories, Yokosuka, Japan 238, Electronics and Communications in Japan, Part 1, vol. 70. No. 9, 1987 Translated from Denshi Tsushin Oakkai Ronbunsh. vol. 69-B. No 2, Feb. 1986. pp. 139-140.

* cited by examiner

*Primary Examiner*—Chi Pham
*Assistant Examiner*—Raj K. Jain
(74) *Attorney, Agent, or Firm*—Borden Ladner Gervais LLP

(57) ABSTRACT

A switch fabric for switching data traffic according to a plurality of links. The data traffic may convey audio information, video information, or any other type of information. The switch fabric includes input, output and at least one intermediate stages, each stage including a plurality of switching elements. The switching elements of the input and output stages respectively have external input and output ports. The switch fabric further includes a switch fabric controller. The switch fabric controller includes a link database including information about the plurality of links. The switch fabric controller is operative to search the link database to identify symmetrical links and to establish internal pathways between the input stage and the output stage through the at least one intermediate stage, wherein at least two symmetrical links identified by the searching are realized using a common switching element of the at least one intermediate stage.

21 Claims, 2 Drawing Sheets

TECHNIQUE FOR COMPUTING PATHWAYS IN A MULTI-STAGE SWITCH FABRIC THROUGH EXPLOITATION OF SYMMETRICAL LINKS

FIELD OF THE INVENTION

The invention relates to devices and methods for switching data traffic, and more particularly to devices and methods to establish internal pathways in a switch fabric needed to realize a plurality of links between external ports.

BACKGROUND OF THE INVENTION

A switch fabric provides pathways for conveying data traffic between external input and output ports. A switch fabric may include an input and an output stage, each stage including a plurality of switching elements. The input and output stages respectively provide a plurality of external input and output ports connected to external connections. The switch fabric also includes one or more intermediate stages including a plurality of switching elements. Internal pathways are selectively established in the switch fabric between the external input ports and the external output ports to provide the switching capability. When the number of external input and output ports is large, it is usually not cost-effective, or technically feasible, to directly connect each external input port to all the external output ports.

One problem that may arise in a switch fabric of the type described above is that the switch fabric may become blocked. The switch fabric is said to be blocked when no pathway between an external input port and an external output port can be established. Therefore, data traffic between these external ports cannot be passed.

Against this background, there exists a need to provide novel techniques to allocate pathways in the switch fabric to reduce the possibility of blocking the switch fabric.

SUMMARY OF THE INVENTION

In a first broad aspect, the invention provides a switch fabric for switching data traffic according to a plurality of links. The data traffic may convey audio information, video information, or any other type of information. The switch fabric includes input, output and at least one intermediate stages, each stage including a plurality of switching elements. The switching elements of the input and output stages respectively have external input and output ports. The switch fabric further includes a switch fabric controller. The switch fabric controller includes a link database including information about the plurality of links. The switch fabric controller is operative to search the link database to identify symmetrical links and to establish internal pathways between the input stage and the output stage through the at least one intermediate stage, wherein at least two symmetrical links identified by the searching are realized using a common switching element of the at least one intermediate stage.

The invention provides a more efficient utilization of the switch fabric. Consequently, a smaller, less complicated, and less expensive switch fabric can be employed.

Different levels of symmetry can exist between links. Two links are symmetrical at the first level if:
  I. the number of external input ports of the first link is equal to the number of external output ports of the second link; and
  II. the number of external output ports of the first link is equal to the number of external input ports of the second link.

This definition applies equally well to unicast links as to multicast links. An internal pathway realizing a unicast link provides connectivity between a single external input port and a single external output port. An internal pathway realizing a multicast link provides connectivity between any other number of ports of the input and output stages.

For example, the link from the external input port #1 to the external output ports #2 and #3 is symmetrical at the first level with the link from external input ports #2 and #3 to the external output port #1. Only the external input ports and the external output ports involved in the respective links, without regard to the internal switching elements involved in the links, determine symmetry at the first level. In other words, two links can be symmetrical at the first level even when they use different ones or different combinations of the intermediate stage switching elements.

Two links are symmetrical at the second level if in addition to being symmetrical at the first level they share a common switching element at the input stage. Also, two links are symmetrical at the third level if in addition to being symmetrical at the second level, they share a common switching element at the output stage.

For clarity, the expression symmetrical link or equivalent used in this specification, without the qualifier "first level", "second level" or "third level" implies symmetry at least at the first level without excluding symmetry at the second level or at the third level.

Bi-directional links between network elements are a specific example of the notion of symmetrical links. Consider, for example, a first network element (network element 1) sending data over a first link to three other network elements (network elements 2, 3 and 4). The network elements 2, 3 and 4 send data to network element 1 over a second link. Therefore, the first and the second would be symmetrical.

In one example of implementation, the switch fabric controller considers links to be realized before passing any traffic. Typically, this situation occurs when the switch fabric is switched from an inactive state to an active state. Symmetrical links are searched for in the link database and instructions are sent to the switching elements such that symmetrical link pairs are realized by using a common switching element(s) of the intermediate stage(s) between the input and the output stages. The number of symmetrical link pairs that can be bundled into one common intermediate stage switching element is practically limited by the bandwidth capacity of the switching elements and the number of available connections between the switching elements.

In another example of implementation, the switch fabric controller computes a revised internal pathway map while the switch fabric is in operation and re-arranges the connections between switching elements to implement the revised internal pathway map. This situation occurs when a new link is to be realized while the switch fabric is in operation. The computation of the revised internal pathway map involves searching at least one existing link (for which an internal pathway has already been set) that is symmetrical to the new link. If one or more such prior symmetrical links are found, the data traffic associated with the new link is passed through an intermediate stage switching element that is used by one of the prior symmetrical link(s). If no symmetrical links are found, then a new internal pathway is created using an available intermediate stage switching element.

In a second broad aspect, the invention provides a switch fabric controller for use with a switch fabric.

In a third broad aspect, the invention provides a computer readable storage medium including a program element for execution by a CPU to compute an internal pathway map for a switch fabric.

In a fourth broad aspect, the invention provides a method for switching data traffic.

BRIEF DESCRIPTION OF THE DRAWINGS

A detailed description of examples of implementation of the present invention is provided herein below with reference to the following drawings, in which.

Figure 1:
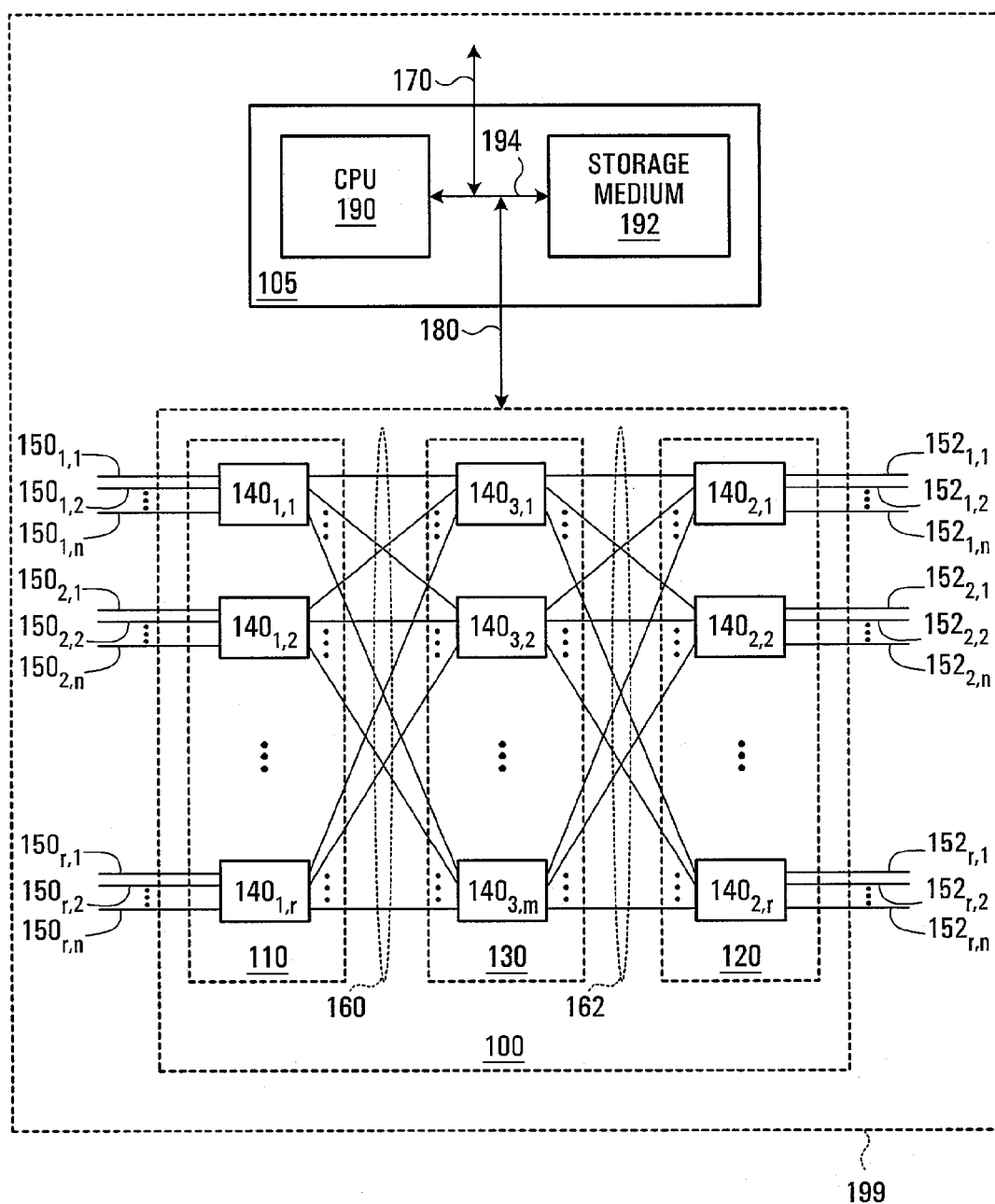
FIG. 1 is a block diagram of a Clos switch fabric.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a multi-stage switch fabric 100. In particular, the switch fabric 199 comprises a three-stage Clos network 100 and a switch fabric controller 105. The Clos network 100 comprises an input stage 110, an output stage 120 and an intermediate stage 130. Data traffic enters and exits the switch fabric 199 respectively at the input and output stages 110 and 120. The intermediate stage 130 is used to convey data traffic internally between the input and the output stages 110 and 120. It should be understood that a switch fabric 199 comprising a Clos network 100 is illustrated on FIG. 1 to give a concrete example of implementation. However, the present invention is applicable to other types of multi-stage switch fabrics, in particular to switch fabrics comprising more than one intermediate stage.

Each of the input, output and intermediate stages 110, 120 and 130 comprises a plurality of switching elements $140_{a,b}$ referred to generally by the reference numeral 140. The input stage 110 comprises the switching elements $140_{1,b}$, the output stage 120 comprises the switching elements $140_{2,b}$ and the intermediate stage 130 comprises the switching elements $140_{3,b}$. The input and output stages 110 and 120 each comprise r switching elements $140_{a,b}$ while the intermediate stage 130 comprises m switching elements $140_{3,b}$. In the detailed example shown in the drawings, all the stages 110, 120 and 130 have an identical number of switching elements 140. This is not an essential requirement and the number of switching elements 140 can vary from one stage (110, 120 or 130) to another without departing from the spirit of the invention.

Each switching element $140_{a,b}$ comprises a plurality of input and output ports, each port being either an internal or an external port. External input and output ports are respectively used to convey data traffic from and to a plurality of external input and output connections $150_{b,c}$ and $152_{b,c}$ and are only present at the input and output stages 110 and 120. The external input and output connections are globally referred to respectively by the reference numerals 150 and 152. Internal input and output ports are used to convey data traffic from and to connection matrices 160 and 162. The connection matrices 160 and 162 respectively connect the intermediate stage 130 to the input stage 110 and the output stage 120 by conveying data traffic between internal input and output ports of switching elements of the input output and intermediate stages 110, 120 and 130 through permanent or temporary internal connections.

In a non-limiting example of implementation, data traffic flows through the switch in only one direction, namely from the right to the left of the switch fabric 199. In other words, data traffic always passes through the Clos network 100 in the following sequence; data enters through the input stage 110, passes through the intermediate stage 130 and leaves the switch fabric through the output stage 120.

The external input connections 150 and the external output connections 152 connect the input stage 110 and the output stage 120 to external network elements that send data traffic to the switch fabric 199 or receive data traffic from the switch fabric 199. Each switching element $140_{a,b}$ of the input (a=1) and output (a=2) stages 110 and 120 comprises n external input or output ports respectively, each one connected to one external input or output connection $150_{b,c}$ or $152_{b,c}$, c varying from 1 to n. Each switching element $140_{a,b}$ of the input (a=1) and output (a=2) stage further comprises m internal input or output ports, each one connected to one of the internal connection matrices 160 and 162. N can be different or equal to m.

The switching elements 140 direct data traffic between the internal and external input and output ports. In a specific example of implementation, each switching element is an Application Specific Integrated Circuit (ASIC).

The switching elements 140 and the connection matrices 160 and 162 are known in the art and their structure and operation will not be described in more detail.

The basic function of the switch fabric controller 105 is to compute an internal pathway map that represents all the internal pathways in the switch fabric 199. Another function of the switch fabric controller 105 is to send control signals to the switching elements 140 and connection matrices 160 and 162, the control signals comprising instructions for establishing the internal pathways according to the pathway map.

In a non-limiting example of implementation, the switch fabric controller 105 includes a Central Processing Unit (CPU) 190 connected to a storage medium 192 over a data bus 194. Although the storage medium 192 is shown as a single block, it may include a plurality of separate components, such as a fixed disk and a Random Access Memory (RAM), among others. The data bus 194 is connected to a signaling link 170 that communicates with the network elements connected to the external connections 150 and 152. The data bus 194 is connected to the Clos network 100 through a control path 180. The control path 180 conveys control signals between the data bus 194 and the switching elements 140 and connection matrices 160 and 162.

For the purpose of this description, a link, an internal connection and an internal pathway are defined as follows. A link is defined by the external input ports of the switching elements 140 of the input stage 110 and the external output ports of the switching elements 140 of the output stage 120 through which data traffic is exchanged. For example, a link could be realized between the external input port connected to the external input connection $150_{1,1}$ and the external output ports connected to the external output connections $152_{2,3}$ and $152_{4,2}$. Stated otherwise, a link is defined solely by the point(s) of entry of data in the switch fabric 199 and the point(s) of release of data from the switch fabric 199.

An internal connection is a permanent or temporary data channel between two of the switching elements 140.

An internal pathway realizes a link by setting internal connections between switching elements 140 of the input, output and intermediates stages 110, 120 and 130. Many different internal pathways may realize a given link. For example, to realize the particular link given in the example above, all the data traffic may go through the switching element $140_{3,1}$ of the intermediate stage 130. Alternatively, the data traffic between the external input and output ports connected to the external input and output connections $150_{1,1}$ and $152_{2,3}$ may go through the switching element $140_{3,1}$ and the data traffic between the external input and output ports connected to the external input and output connections $150_{1,1}$ and $152_{4,2}$ may go through the switching element $140_{3,4}$.

The switch fabric controller 105 is adapted to receive information signals through the signaling link 170 from the network elements with which the switch fabric 199 exchanges data traffic, the information signals providing information concerning links to be realized by the switch fabric 199. A link database, which resides in the storage medium 192, stores the information concerning the links to be realized.

Figure 2:
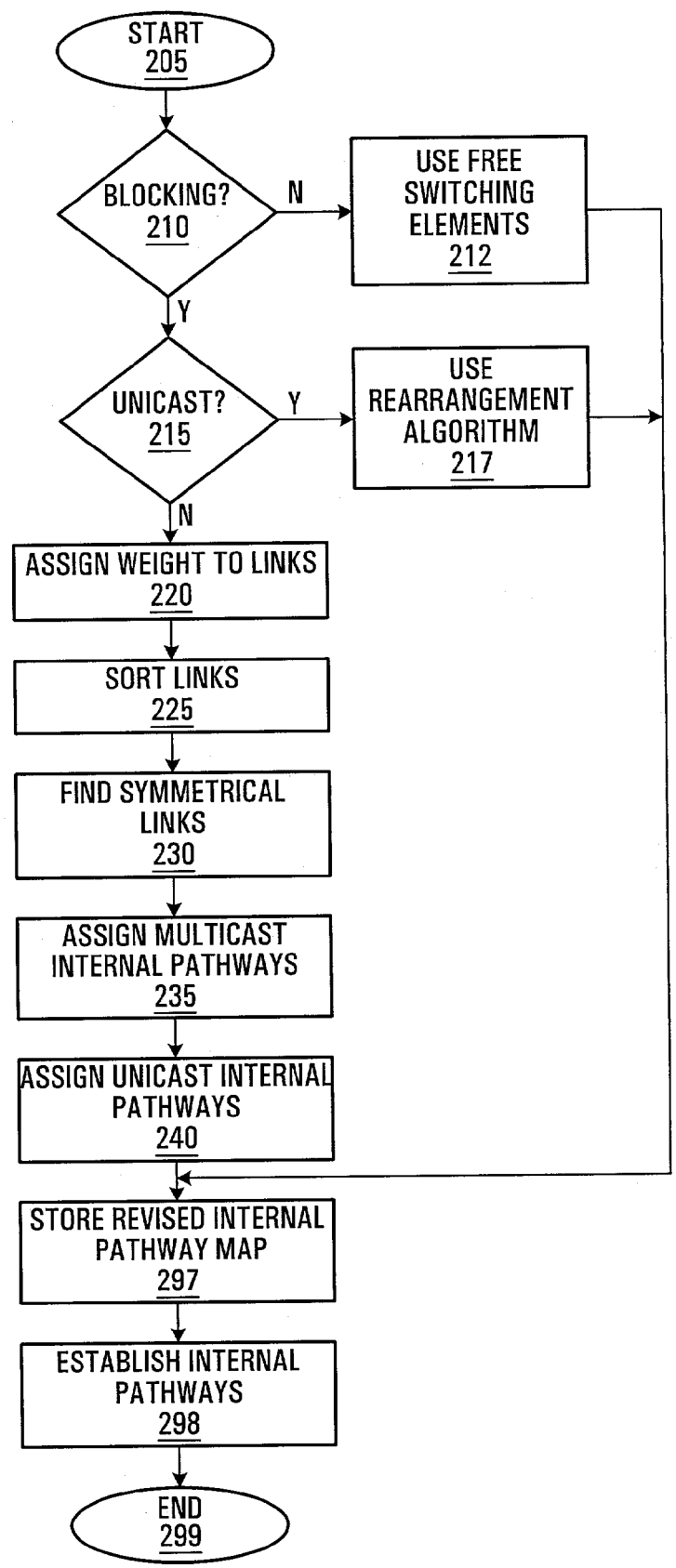
FIG. 2 is a flow chart of an internal pathway map creation algorithm.

FIG. 2 is a flowchart of an example of implementation of a process for computing an internal pathway map implemented by the switch fabric controller 105. This process is implemented by software residing in the storage medium 192 and executed by the CPU 190. In a non-limiting example of implementation, the software is a program element comprising a searching module for searching the link database to identify pairs of symmetrical links (symmetrical links at the first level, the second level and the third level, as the case may be) and a processing module for computing internal pathways between the input stage and the output stage.

The process illustrated on FIG. 2 may be run every time when a new internal pathway needs to be added to an already existing internal pathway map. This happens when the switch fabric 199 is in operation and a new link needs to be realized. It will be plain to the reader skilled in the art that the process can also be used, with some minor modifications, to compute a new internal pathway map, which may be the case if the switch fabric 199 is reset.

The process begins at step 205. At step 210, the switch fabric controller 105 examines if it is possible to allocate an internal pathway to realize a new link by using free internal connections. If there is no blocking, an internal pathway allocation is made at step 212, thereby producing a modified internal pathway map, which is stored in the storage medium 192 at step 297. Then, at step 298, the CPU 190 sends control signals to the switching elements 140 and connection matrices 160 and 162 such that the switch fabric implements the internal pathway map including the internal pathway for the new link.

If no internal pathway can be found for the new link, there is a blocking problem. The method continues to step 215 in which the switch fabric controller 105 examines if the link to realize is a unicast link or not. If it is a unicast link, a rearrangement algorithm is used at step 217 to resolve the blocking. An example of a rearrangement algorithm is described in Ohta et al., "A Rearrangement Algorithm for Three-Stage Switching", Electronics and communications in Japan, Part 1, Vol. 70, No. 9, 1987. The contents of this document are incorporated herein by reference. Other rearrangement algorithms can also be used without departing from the spirit of the invention.

The step 217 yields a revised internal pathway map, which includes an internal pathway for the new link. The revised internal pathway map is stored at step 297 in the storage medium 192. Then, at step 298, the CPU 190 sends control signals to the switching elements 140 and connection matrices 160 and 162 for implementing the revised pathway map.

If the link to realize is multicast, the method continues to step 220, wherein all the links in the link database are examined and a weight is assigned to each link. Methods of assigning weights to links are well known in the art. In a non-limiting example of implementation weights are assigned according to the complexity of the link, the complexity being determined by the number of external input and output ports involved in realizing the link. The higher the complexity, the higher the weight.

At step 225, the links are sorted by the program element according to the weight assigned to them. In one particular example of implementation, the links are sorted in decreasing order of weight (complexity).

At step 230, the searching module of the program element searches the sorted links to identify pairs of symmetrical links, in particular pairs of multicast links that are symmetrical at the third level..

At step 235, internal pathways are assigned to the pairs of third level symmetrical links by the processing module of the program element, such that the internal pathways for both links in the pair are routed through a common switching element 140 of the intermediate stage 130. In the case of multiple intermediate stages, the internal pathways for both links in the pair are routed through the same switching element in each intermediate stage.

When all the multicast links have been allocated, the unicast links are allocated using the remaining free connections at step 240. If there is blocking in the allocation of unicast links, a rearrangement algorithm, which may be the rearrangement algorithm referred to above, can be used.

The above computations produce an internal pathway map, which is stored in the storage medium 192 at step 297. Subsequently, at step 298, control signals are sent over the control path 180 to configure the switching elements 140 and the connection matrices 160 and 162 in order to set internal connections according to the internal pathway map, thereby realizing the links.

The process terminates at step 299. At this point, signaling information can be sent through the signaling link 170 to the network elements to notify those network elements that the switch fabric 199 is ready to pass data traffic.

The reader skilled in the art will appreciate that the method described in FIG. 2 has partitioned the switch fabric (100) into two parts: one part that has non-rearrangeable multicast links as realized at step 235, and the second part having rearrangeable unicast links. As well, given a three-stage rearrangeably non-blocking Clos switch fabric, the switch fabric 100 is non-blocking because the rearrangeable part retains the non-blocking characteristics.

As a variant to the method described in FIG. 2, the invention provides a method allowing realizing a class of multicast internal pathways as rearrangeable links. This class includes bi-directional links whereby there are protection constraints among the external input ports (150) and external output ports (152).

The allocation of internal pathways that are constrained to pass through a common switching element 140 is particularly advantageous in the context of protection switching, wherein protection pathways have to be set within a small delay subsequent to a failure of a working link, such that the data traffic on a working link is redirected over a protection link. In this case, the switch controller 105 is adapted to receive signals from network elements comprising instructions regarding the protection switching to effect. In general, this method allows the protection switching activity to be achieved quickly without having to perform link rearrangements throughout the switch fabric 100.

The method is described below. The links to be established are separated in first and second groups of links. The separation in groups is effected in the following fashion. Each link in the link database is considered separately. The first link is placed arbitrarily in one of the two groups, say group #1. The switch fabric controller 105 then searches the remaining links in the links database for a link that is symmetrical to the first link. In this example symmetry at the third level is considered. If such third level symmetrical link is found, then the third level symmetrical link is automatically placed in the other group, say group #2. The process continues until all the links have been assigned to group #1 or to group #2. As a result, two groups of links are produced, where links that are symmetrical at the third level to one another are placed in different groups.

Next, half of the interconnectivity 160 between each input 110 and intermediate stage 130 switching element is allocated for group #1 links. The same is done for the interconnectivity between the intermediate stage 130 and the output stage 120 switching elements. The remaining interconnectivity is allocated for group #2 links. Essentially, this leaves half of the possible internal pathways allocated for the group #1 links and the other half for the group #2 links.

Internal pathways are then computed by the switch fabric controller 105 for the group #1 links using the intermediate stage interconnectivity allocated for group #1. The process 240 is used for allocating internal pathways for group #1 links. These interconnects are then copied from 160 to 162 and from 162 to 160 symmetrically into the connectivity reserved for group #2. This realizes the group #2 links. A non-limiting example will illustrate this method.

Assume $150_{1,1}$ and $150_{1,2}$ are protecting and working inputs respectively, and $152_{1,1}$ and $152_{1,2}$ are the corresponding outputs wherein $150_{1,1}$ protects $150_{1,2}$ and $152_{1,1}$ protects $152_{1,2}$. Further assume $150_{r,1}$ and $150_{r,2}$ are low and high priority inputs, and $152_{r,1}$ and $152_{r,2}$ are the corresponding outputs. Assume that there are two interconnects between each of the switching elements 140 in this simplified example. Assign the first interconnect to group #1 and the second to group #2.

Now assume the switch fabric controller 105 requests the following connections:

low priority bi-directional links $150_{r,1}$ to $152_{1,1}$ and
high priority bi-directional links $150_{1,2}$ to $152_{r,2}$.

Assign $150_{r,1}$ to $152_{1,1}$ and $150_{r,2}$ to $152_{1,2}$ to group #1 and the other two links to group #2.

Assume the link $150_{r,1}$ to $152_{1,1}$ is realized using the pathway from $140_{1,r}$ via the first interconnect to $140_{3,2}$, and from $140_{3,2}$ via the first interconnect to $140_{2,1}$. Then, the link $150_{1,1}$ to $152_{r,1}$ is automatically realized by using the interconnects allocated to group #2. That is, the pathway from $140_{1,1}$ via the second interconnect to $140_{3,2}$ is used, and the pathway from $140_{3,2}$ via the second interconnect to $140_{2,r}$ is used. Note the group #2 pathway was obtained from the group #1 pathway by using symmetrical links.

Assume the high priority links are realized in the same manner through $140_{3,1}$. It will be appreciated that once one link in a pair of symmetrical links is assigned to a first internal pathway, the possibility of finding a second internal pathway for the other link in the symmetrical pair that passes through the same switching element 140 of the intermediate stage 130 is large. Using this method, a three-stage rearrangeably non-blocking Clos switch fabric can avoid blocking situations.

With the links now established in this manner on the switch fabric, the reader skilled in the art will appreciate that various forms of protection switching can be executed quickly without having to perform any link rearrangement throughout the switch fabric.

As a non-limiting example, if the external input port $150_{1,2}$ fails due to an upstream failure then the working link from $150_{1,2}$ to $152_{r,2}$ is protected by the switch fabric controller 105 making a change at switching element $140_{1,1}$ to alter the internal connections such that the working link selects the traffic from the protection input port $150_{1,1}$. Similar protection switch behaviour would occur if the external output port $152_{1,1}$ were to fail, whereby only one switching element is affected. If there was either an upstream or a downstream failure whereby the network element was required to passthrough protected traffic from $150_{1,1}$ to $152_{1,1}$ this is achieved by the switch fabric controller 105 making a change at switching element $140_{3,2}$ to alter the internal connections such that the traffic from $150_{1,1}$ is redirected toward external output port $152_{1,1}$.

At the same time the protection switching procedure is implemented, the lower priority traffic is negated. In the case of the protection switch required to passthrough protection traffic, the low priority traffic at external output port $152_{r,1}$ and the low priority traffic at external input port $150_{1,1}$ is negated.

In another non-limiting example of the protection switching behaviour this method provides, assume that two links are realized through the switch fabric 100. The first link is a working link, in other words it is the link that carries data traffic during normal operation of the switch fabric 100. This link enters the switch fabric 100 at the external input connection $150_{1,1}$ and leaves at the external output connection $152_{r,n}$, passing through the switching element $140_{3,2}$. The working link is protected by a protection link that enters at the external input connection $150_{r,n}$, leaves at the external output connection $152_{1,1}$ and passes through the switching element $140_{3,2}$. To take advantage of the bandwidth available on the protection link while the working path is operational, low priority data traffic is passed over at least a portion of the protection link. This low priority data traffic enters at the external input connection $150_{r,2}$, leaves at the external output connection $152_{1,1}$ and passes through the switching element $140_{3,2}$. If the working link fails, say because of a failure downstream the external output connection $152_{r,n}$, a protection switching procedure is implemented by the switch fabric controller 105 such that the data traffic is now redirected toward the external output connection $152_{1,1}$. This is effected simply by making a change at the switching element $140_{3,2}$ to alter the internal connections between the switching element $140_{3,2}$ and the output stage 120. This operation can be done very rapidly since only a single switching event at the switching element $140_{3,2}$ is necessary and no link rearrangement is required. As a result data traffic entering at the external input connection $150_{1,1}$ will now leave at the external output connection $152_{1,1}$ and still pass internally through the switching element $140_{3,2}$.

At the same time the protection switching procedure is implemented, the lower priority data traffic is dropped and the link entering at the external input connection $150_{r,2}$, leaving at the external output connection $152_{1,1}$ and passing through the switching element $140_{3,2}$ is negated.

In the earlier aspect of the invention, symmetrical links are constrained to pass through a common switching element 140 of the intermediate stage 130. Accordingly, there is an advantage to use one of the links in a symmetrical pair of links to provide protection switching for the other link that constitutes the working link. This approach makes the designation of protection links and pathways simple once the symmetrical links in the links database have been identified. Evidently, the invention is not limited to this feature and protection pathways can be assigned or created without any regard to symmetry between links.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A switch fabric for switching data traffic according to a plurality of links, comprising:
   a) an input stage including a plurality of switching elements having external input ports;
   b) an output stage including a plurality of switching elements having external output ports;
   c) at least one intermediate stage including a plurality of switching elements;
   d) a switch fabric controller wherein:
      i) said switch fabric includes a link database including information about the plurality of links;
      ii) said switch fabric controller is operative to search said link database to identify symmetrical links; and
      iii) said switch fabric controller is operative for establishing internal pathways between said input stage and said output stage through said at least one intermediate stage, wherein at least two symmetrical links identified by the searching are realized using a common switching element of said at least one intermediate stage.

2. A switch fabric as defined in claim 1, wherein said switch fabric circuit switches data traffic.

3. A switch fabric as defined in claim 2, wherein said switch fabric controller is operative to search said link database to identify links symmetrical at the second level and establish internal pathways between the input stage and the output stage through the at least one intermediate stage, wherein at least two symmetrical links at the second level identified by the searching are realized over a common switching element of the at least one intermediate stage.

4. A switch fabric as defined in claim 2, wherein said switch fabric controller is operative to search said link database to identify links symmetrical at the third level and establish internal pathways between the input stage and the output stage through the at least one intermediate stage, wherein at least two symmetrical links at the third level identified by the searching are realized over a common switching element of the at least one intermediate stage.

5. A switch fabric as defined in claim 4, wherein said switch fabric controller is operative to search said link database to identify all pairs of symmetrical links at the third level present in said link database.

6. A switch fabric as defined in claim 5, wherein each pair of symmetrical links at the third level is realized over a respective common switching element of said at least one intermediate stage.

7. A switch fabric as defined in claim 4, wherein said link database includes symmetrical links at the third level that are unicast.

8. A switch fabric as defined in claim 4, wherein said link database includes symmetrical links at the third level that are multicast.

9. A switch fabric as defined in claim 4, including a single intermediate stage.

10. A switch fabric as defined in claim 9, wherein the links in said link database are characterized by a complexity, said switch fabric controller being operative to assign weights to links in said link database according to the complexity of the links, reorder said link database according to the assigned weights in decreasing order of complexity and process the reordered link database starting from the link having the highest weight to assign switching elements of said at least one intermediate stage when computing internal pathways for the links in the reordered link database.

11. A switch fabric as defined in claim 4, wherein said switch fabric controller is operative to separate the plurality of links in at least two groups, wherein the at least two symmetrical links at the third level identified by the searching are placed in different groups.

12. A switch fabric as defined in claim 11, wherein said switch fabric is operative for establishing internal pathways for links in one of said groups and subsequently establishing internal pathways for links in the other of said groups.

13. A switch fabric for switching data traffic according to a plurality of links, comprising:
   a) input stage means including a plurality of switching elements having external ports;
   b) output stage means including a plurality of switching elements having external ports;
   c) least one intermediate stage means including a plurality of switching element means;
   d) a switch fabric controller means wherein:
      i) said switch fabric includes a link database means including information about the plurality of links;
      ii) said switch fabric controller means is operative to search said link database means to identify symmetrical links; and
      iii) said switch fabric controller is operative for establishing internal pathways between said input stage means and said output stage means through said at least one intermediate stage means, wherein at least two symmetrical links identified by the searching are realized using a common switching element means of said at least one intermediate stage means.

14. A switch fabric controller for use with a switch fabric including:
   a) an input stage including a plurality of switching elements having external input ports;
   b) an output stage including a plurality of switching elements having external output ports;
   c) at least one intermediate stage including a plurality of switching element;
   d) said switch fabric controller, comprising:
      i) a link database including information about the plurality of links;
      ii) said switch fabric controller is operative to search said link database to identify symmetrical links; and
      iii) said switch fabric controller is operative for establishing internal pathways between the input stage and the output stage through the at least one intermediate stage, wherein at least two symmetrical links identified by the searching are realized using a common switching element of the at least one intermediate stage.

15. A computer readable storage medium including a program element for execution by a CPU to compute an internal pathway map for a switch fabric that includes:
   a) an input stage including a plurality of switching elements having external input ports;
   b) an output stage including a plurality of switching elements having external output ports;

c) at least one intermediate stage including a plurality of switching elements;
d) a link database including information about the plurality of links according to which data traffic is to be switched by the switch fabric;
e) said program element, comprising:
  i) a searching module for searching the link database to identify pairs of symmetrical links;
  ii) a processing module for computing internal pathways between the input stage and the output stage, the computing characterized in that at least two symmetrical links identified by the searching are realized using a common switching element of the at least one intermediate stage.

16. In a method for switching data traffic according to a plurality of links through a switch fabric, having:
a) an input stage including a plurality of switching elements having external input ports;
b) an output stage including a plurality of switching elements having external output ports;
c) at least one intermediate stage including a plurality of switching elements; and
d) a link database including information about the plurality of links according to which data traffic is to be switched by the switch fabric;
e) said method, including:
  i) searching the link database to identify pairs of symmetrical links;
  ii) establishing internal pathways between the input stage and the output stage through the at least one intermediate stage, wherein at least two symmetrical links identified by the searching are realized over a common switching element of the at least one intermediate stage.

17. A method as defined in claim 15, wherein the data traffic is for a circuit switched data traffic.

18. A method as defined in claim 16, including searching the link database to identify all pairs of symmetrical links present in the link database.

19. A method as defined in claim 16, wherein the method includes searching the link database to identify pairs of symmetrical links at the second level and establishing internal pathways between the input stage and the output stage through the at least one intermediate stage, wherein at least two symmetrical links at the second level identified by the searching are realized over a common switching element of the at least one intermediate stage.

20. A method as defined in claim 18, wherein the method includes searching the link database to identify pairs of symmetrical links at the third level and establishing internal pathways between the input stage and the output stage through the at least one intermediate stage, wherein at least two symmetrical links at the third level identified by the searching are realized over a common switching element of the at least one intermediate stage.

21. A method as defined in claim 16, wherein the links in the link database are characterized by a complexity, said method including assigning weights to links in the link database according to the complexity of the links, reordering the link database according to the assigned weights in decreasing order of complexity and processing the reordered link database starting from the link having the highest weight to assign switching elements of the at least one intermediate stage when computing internal pathways for the links in the reordered link database.

* * * * *